United States Patent
Tiedemann, Jr. et al.

(10) Patent No.: US 7,120,134 B2
(45) Date of Patent: Oct. 10, 2006

(54) REVERSE LINK CHANNEL ARCHITECTURE FOR A WIRELESS COMMUNICATION SYSTEM

(75) Inventors: Edward G. Tiedemann, Jr., Concord, MA (US); Tao Chen, San Diego, CA (US); Avinash Jain, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 740 days.

(21) Appl. No.: 09/788,259

(22) Filed: Feb. 15, 2001

(65) Prior Publication Data

US 2002/0154610 A1   Oct. 24, 2002

(51) Int. Cl.
*H04Q 7/00* (2006.01)
*H04Q 7/20* (2006.01)
*H04B 7/216* (2006.01)

(52) U.S. Cl. .................. 370/329; 370/342; 455/522
(58) Field of Classification Search .......... 370/252, 370/311, 329, 342; 455/522
See application file for complete search history.

(56) References Cited

U.S. PATENT DOCUMENTS

| | | | |
|---|---|---|---|
| 5,485,486 A | 1/1996 | Gilhousen et al. | |
| 5,657,420 A | 8/1997 | Jacobs et al. | |
| 5,742,734 A | 4/1998 | DeJaco et al. | |
| 5,751,725 A | 5/1998 | Chen | |
| 5,778,338 A | 7/1998 | Jacobs et al. | |
| 5,822,318 A | 10/1998 | Tiedemann, Jr. et al. | |
| 5,991,284 A | 11/1999 | Willenegger et al. | |
| 6,021,124 A | 2/2000 | Haartsen ................ | 370/336 |
| 6,137,840 A | 10/2000 | Tiedemann, Jr. et al. | |
| 6,148,208 A | 11/2000 | Love ..................... | 455/442 |
| 6,175,590 B1 | 1/2001 | Stein | |
| 6,208,620 B1 * | 3/2001 | Sen et al. ............... | 370/231 |
| 6,434,367 B1 * | 8/2002 | Kumar et al. ............ | 455/70 |
| 6,590,873 B1 * | 7/2003 | Li et al. ................ | 370/318 |
| 6,724,740 B1 * | 4/2004 | Choi et al. .............. | 370/335 |
| 6,741,862 B1 * | 5/2004 | Chung et al. ........... | 455/452.1 |
| 6,757,270 B1 * | 6/2004 | Kumar et al. ........... | 370/342 |
| 6,801,264 B1 * | 10/2004 | Kumagawa et al. ........ | 349/38 |
| 6,819,660 B1 * | 11/2004 | Khare et al. ............ | 370/342 |
| 6,879,839 B1 * | 4/2005 | Kosugi .................. | 455/522 |
| 2003/0067899 A9 * | 4/2003 | Chen et al. ............. | 370/335 |

FOREIGN PATENT DOCUMENTS

| | | |
|---|---|---|
| EP | 1059736 A | 12/2000 |
| WO | 9949595 A | 9/1999 |
| WO | 0072498 A | 11/2000 |

* cited by examiner

*Primary Examiner*—Hassan Kizou
*Assistant Examiner*—Hong Sol Cho
(74) *Attorney, Agent, or Firm*—Philip R. Wadsworth; Thien T. Nguyen

(57) ABSTRACT

A channel structure and mechanisms that support effective and efficient allocation and utilization of the reverse link resources. In one aspect, mechanisms are provided to quickly assign resources (e.g., a supplemental channel) as needed, and to quickly de-assign the resources when not needed or to maintain system stability. The reverse link resources may be quickly assigned and de-assigned via short messages exchanged on control channels on the forward and reverse links. In another aspect, mechanisms are provided to facilitate efficient and reliable data transmission. A reliable acknowledgment/negative acknowledgment scheme and an efficient retransmission scheme are provided. Mechanisms are also provided to control the transmit power and/or data rate of the remote terminals to achieve high performance and avoid instability.

9 Claims, 8 Drawing Sheets

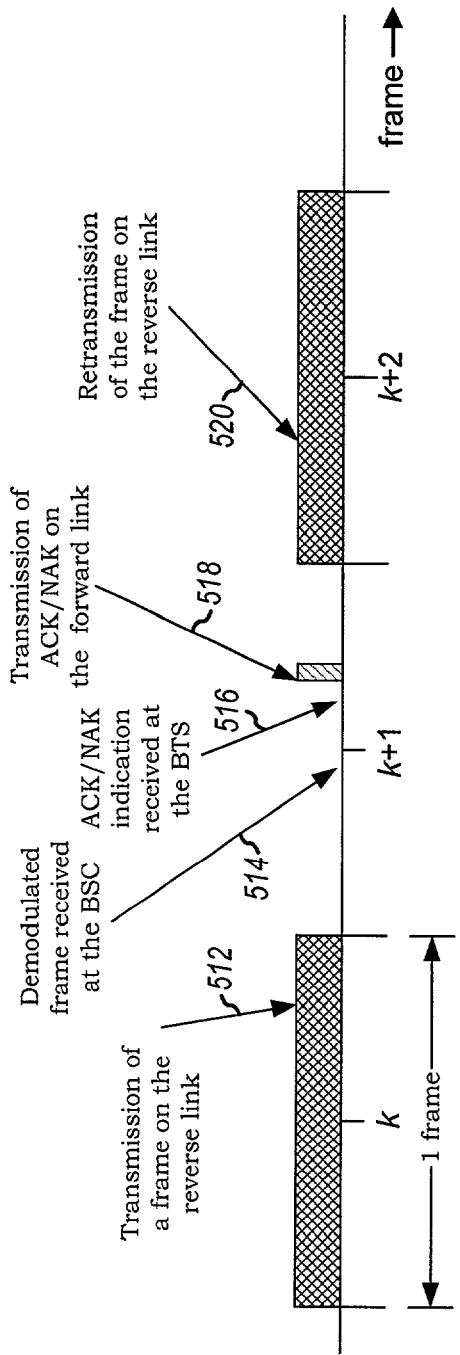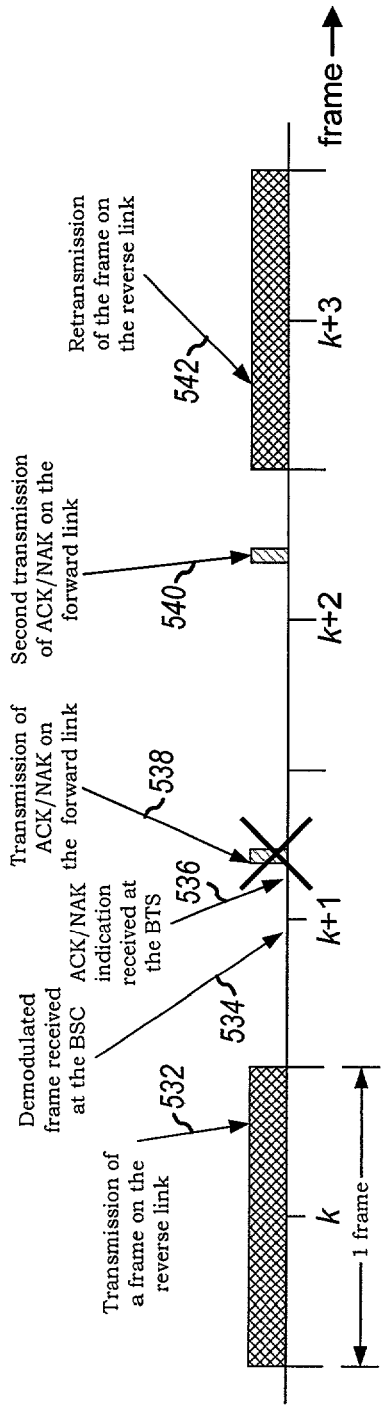

REVERSE LINK CHANNEL ARCHITECTURE FOR A WIRELESS COMMUNICATION SYSTEM

BACKGROUND

1. Field

The present invention relates generally to data communication, and more specifically to a novel and improved reverse link architecture for a wireless communication system.

2. Background

Wireless communication systems are widely deployed to provide various types of communication including voice and packet data services. These systems may be based on code division multiple access (CDMA), time division multiple access (TDMA), or some other modulation techniques. CDMA systems may provide certain advantages over other types of system, including increased system capacity.

In a wireless communication system, a user with a remote terminal (e.g., a cellular phone) communicates with another user through transmissions on the forward and reverse links via one or more base stations. The forward link (i.e., downlink) refers to transmission from the base station to the user terminal, and the reverse link (i.e., uplink) refers to transmission from the user terminal to the base station. The forward and reverse links are typically allocated different frequencies, a method called frequency division multiplexing (FDM).

The characteristics of packet data transmission on the forward and reverse links are typically very different. On the forward link, the base station usually knows whether or not it has data to transmit, the amount of data, and the identity of the recipient remote terminals. The base station may further be provided with the "efficiency" achieved by each recipient remote terminal, which may be quantified as the amount of transmit power needed per bit. Based on the known information, the base station may be able to efficiently schedule data transmissions to the remote terminals at the times and data rates selected to achieve the desired performance.

On the reverse link, the base station typically does not know a priori which remote terminals have packet data to transmit, or how much. The base station is typically aware of each received remote terminal's efficiency, which may be quantified by the energy-per-bit-to-total-noise-plus-interface ratio, $E_c/(N_o+I_o)$, needed at the base station to correctly receive a data transmission. The base station may then allocate resources to the remote terminals whenever requested and as available.

Because of uncertainty in user demands, the usage on the reverse link may fluctuate widely. If many remote terminals transmit at the same time, high interference is generated at the base station. The transmit power from the remote terminals would need to be increased to maintain the target $E_c/(N_o+I_o)$, which would then result in higher levels of interference. If the transmit power is further increased in this manner, a "black out" may ultimately result and the transmissions from all or a large percentage of the remote terminals may not be properly received. This is due to the remote terminal not being able to transmit at sufficient power to close the link to the base station.

In a CDMA system, the channel loading on the reverse link is often characterized by what is referred to as the "rise-over-thermal". The rise-over-thermal is the ratio of the total received power at a base station receiver to the power of the thermal noise. Based on theoretical capacity calculations for a CDMA reverse link, there is a theoretical curve that shows the rise-over-thermal increasing with loading. The loading at which the rise-over-thermal is infinite is often referred to as the "pole". A loading that has a rise-over-thermal of 3 dB corresponds to a loading of about 50%, or about half of the number of users that can be supported when at the pole. As the number of users increases and as the data rates of the users increase, the loading becomes higher. Correspondingly, as the loading increases, the amount of power that a remote terminal must transmit increases. The rise-over-thermal and channel loading are described in further detail by A. J. Viterbi in "CDMA: Principles of Spread Spectrum Communication," Addison-Wesley Wireless Communications Series, May 1995, ISBN: 0201633744, which is incorporated herein by reference.

The Viterbi reference provides classical equations that show the relationship between the rise-over-thermal, the number of users, and the data rates of the users. The equations also show that there is greater capacity (in bits/second) if a few users transmit at a high rate than a larger number of users transmit at a higher rate. This is due to the interference between transmitting users.

In a typical CDMA system, many users' data rates are continuously changing. For example, in an IS-95 or cdma2000 system, a voice user typically transmits at one of four rates, corresponding to the voice activity at the remote terminal, as described in U.S. Pat. Nos. 5,657,420 and 5,778,338, both entitled "VARIABLE RATE VOCODER" and U.S. Pat. No. 5,742,734, entitled "ENCODING RATE SELECTION IN A VARIABLE RATE VOCODER". Similarly, many data users are continually varying their data rates. All this creates a considerable amount of variation in the amount of data being transmitted simultaneously, and hence a considerable variation in the rise-over-thermal.

As can be seen from the above, there is a need in the art for a reverse link channel structure capable of achieving high performance for packet data transmission, and which takes into consideration the data transmission characteristics of the reverse links.

SUMMARY

Aspects of the invention provide mechanisms that support effective and efficient allocation and utilization of the reverse link resources. In one aspect, mechanisms are provided to quickly assign resources (e.g., supplemental channels) as needed, and to quickly de-assign the resources when not needed or to maintain system stability. The reverse link resources may be quickly assigned and de-assigned via short messages exchanged on control channels on the forward and reverse links. In another aspect, mechanisms are provided to facilitate efficient and reliable data transmission. In particular, a reliable acknowledgment/negative acknowledgment scheme and an efficient retransmission scheme are provided. In yet another aspect, mechanisms are provided to control the transmit power and/or data rate of the remote terminals to achieve high performance and avoid instability. Another aspect of the invention provides a channel structure capable of implementing the features described above. These and other aspects are described in further detail below.

The disclosed embodiments further provide methods, channel structures, and apparatus that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 5A and 5B are diagrams illustrating a data transmission on the reverse link and an Ack/Nak message transmission for two different scenarios;

DETAILED DESCRIPTION

Figure 1:
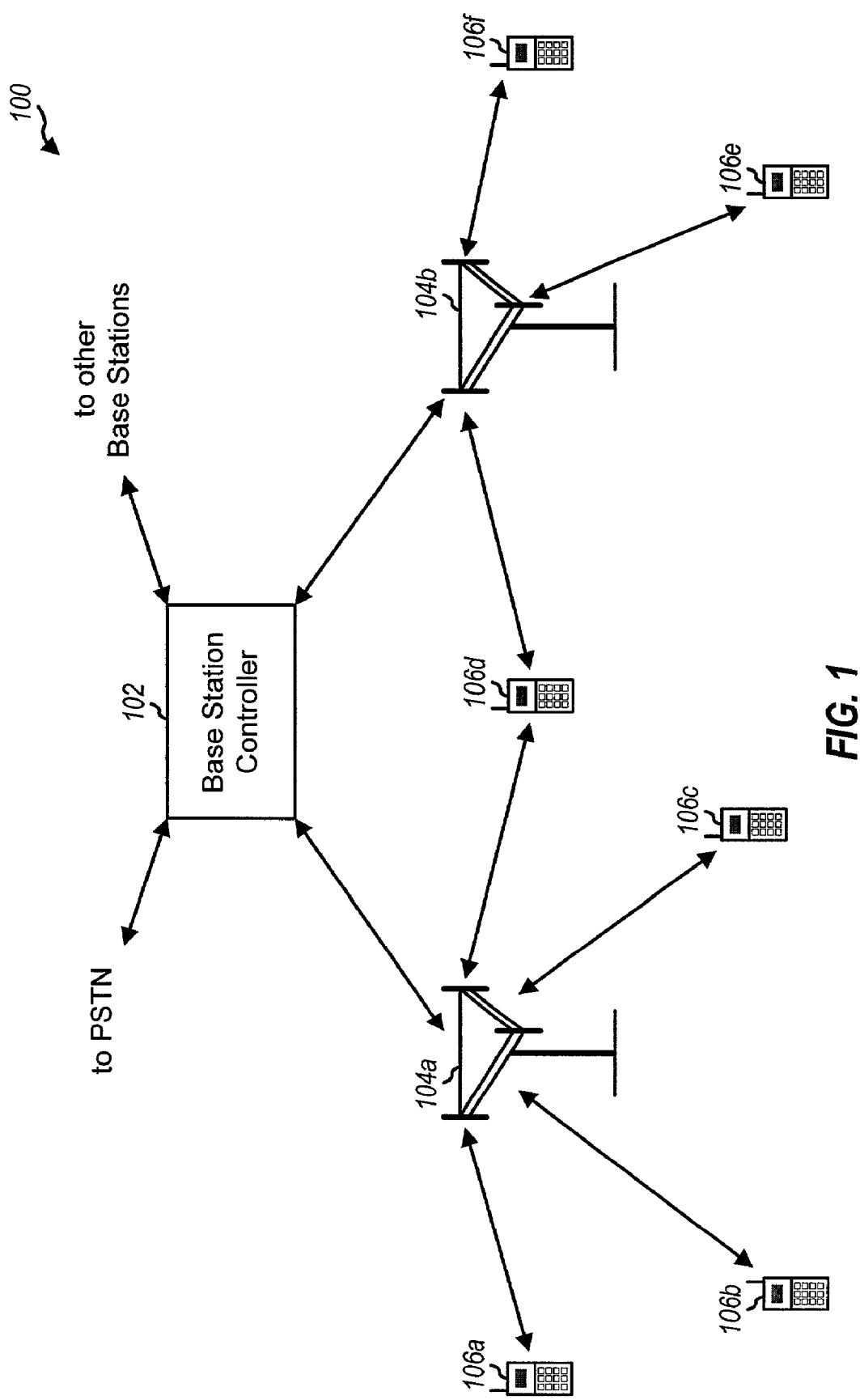
FIG. 1 is a diagram of a wireless communication system that supports a number of users.

FIG. 1 is a diagram of a wireless communication system 100 that supports a number of users and capable of implementing various aspects of the invention. System 100 provides communication for a number of cells, with each cell being serviced by a corresponding base station 104. The base stations are also commonly referred to as base transceiver systems (BTSs). Various remote terminals 106 are dispersed throughout the system. Each remote terminal 106 may communicate with one or more base stations 104 on the forward and reverse links at any particular moment, depending on whether or not the remote terminal is active and whether or not it is in soft handoff. The forward link refers to transmission from base station 104 to remote terminal 106, and the reverse link refers to transmission from remote terminal 106 to base station 104. As shown in FIG. 1, base station 104a communicates with remote terminals 106a, 106b, 106c, and 106d, and base station 104b communicates with remote terminals 106d, 106e, and 106f. Remote terminal 106d is in soft handoff and concurrently communicates with base stations 104a and 104b.

In system 100, a base station controller (BSC) 102 couples to base stations 104 and may further couple to a public switched telephone network (PSTN). The coupling to the PSTN is typically achieved via a mobile switching center (MSC), which is not shown in FIG. 1 for simplicity. The BSC may also couple into a packet network, which is typically achieved via a packet data serving node (PDSN) that is also not shown in FIG. 1. BSC 102 provides coordination and control for the base stations coupled to it. BSC 102 further controls the routing of telephone calls among remote terminals 106, and between remote terminals 106 and users coupled to the PSTN (e.g., conventional telephones) and to the packet network, via base stations 104.

System 100 may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-D Recommended Minimum Standard for Dual-Mode Wideband Spread Spectrum Cellular Mobile Station" (the IS-98 standard), (3) the documents offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the documents offered by a consortium named "3rd Generation Partnership Project 2" (3GPP2) and embodied in a set of documents including Document Nos. C.S0002-A, C.S0005-A, C.S0010-A, C.S0011-A. C.S0024, and C.S0026 (the cdma2000 standard), and (5) some other standards. In the case of the 3GPP and 3GPP2 documents, these are converted by standards bodies worldwide (e.g., TIA, ETSI, ARIB, TTA, and CWTS) into regional standards and have been converted into international standards by the International Telecommunications Union (ITU). These standards are incorporated herein by reference.

Figure 2:
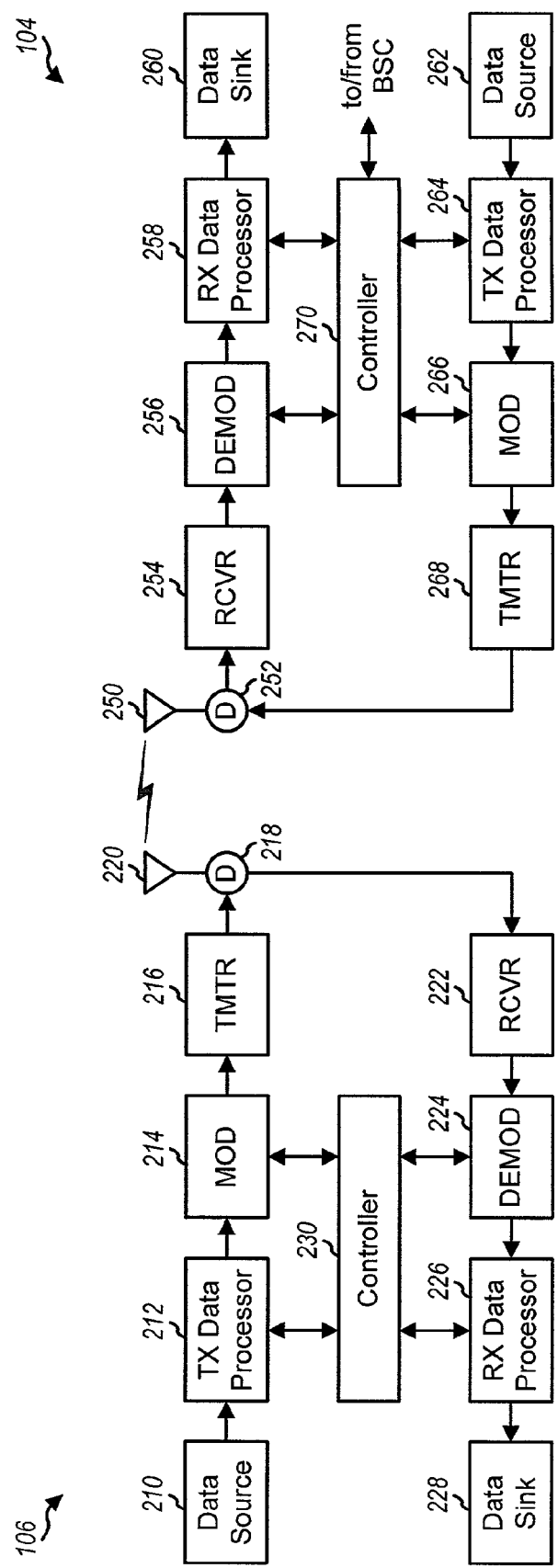
FIG. 2 is a simplified block diagram of an embodiment of a base station and a remote terminal.

FIG. 2 is a simplified block diagram of an embodiment of base station 104 and remote terminal 106, which are capable of implementing various aspects of the invention. For a particular communication, voice data, packet data, and/or messages may be exchanged between base station 104 and remote terminal 106. Various types of messages may be transmitted such as messages used to establish a communication session between the base station and remote terminal and messages used to control a data transmission (e.g., power control, data rate information, acknowledgment, and so on). Some of these message types are described in further detail below.

For the reverse link, at remote terminal 106, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, Turbo, block, and other coding, or no coding at all. Typically, voice data, packet data, and messages are coded using different schemes, and different types of message may also be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 104.

At base station 104, the reverse link signal is received by an antenna 250, routed through a duplexer 252, and provided to a receiver unit (RCVR) 254. Receiver unit 254 conditions (e.g., filters, amplifies, downconverts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. The processing by demodulator 256 and RX data processor 258 are complementary to that performed at remote terminal 106. Demodulator 256 and RX data processor 258 may further be operated to process multiple transmissions received via multiple channels, e.g., a reverse fundamental channel (R-FCH) and a reverse supplemental channel (R-SCH). Also, transmissions may be received simultaneously from multiple remote terminals, each of which may be transmitting on a reverse fundamental channel, a reverse supplemental channel, or both.

On the forward link, at base station 104, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to remote terminal 106.

At remote terminal 106, the forward link signal is received by antenna 220, routed through duplexer 218, and provided to a receiver unit 222. Receiver unit 222 conditions (e.g., downconverts, filters, amplifies, quadrature demodulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230.

The reverse link has some characteristics that are very different from those of the forward link. In particular, the data transmission characteristics, soft handoff behaviors, and fading phenomenon are typically very different between the forward and reverse links.

As noted above, on the reverse link, the base station typically does not know a priori which remote terminals have packet data to transmit, or how much. Thus, the base station may allocate resources to the remote terminals whenever requested and as available. Because of uncertainty in user demands, the usage on the reverse link may fluctuate widely.

In accordance with aspects of the invention, mechanisms are provided to effectively and efficiently allocate and utilize the reverse link resources. In one aspect, mechanisms are provided to quickly assign resources as needed, and to quickly de-assign resources when not needed or to maintain system stability. The reverse link resources may be assigned via a supplemental channel that is used for packet data transmission. In another aspect, mechanisms are provided to facilitate efficient and reliable data transmission. In particular, a reliable acknowledgment scheme and an efficient retransmission scheme are provided. In yet another aspect, mechanisms are provided to control the transmit power of the remote terminals to achieve high performance and avoid instability. These and other aspects are described in further detail below.

Figure 3A:
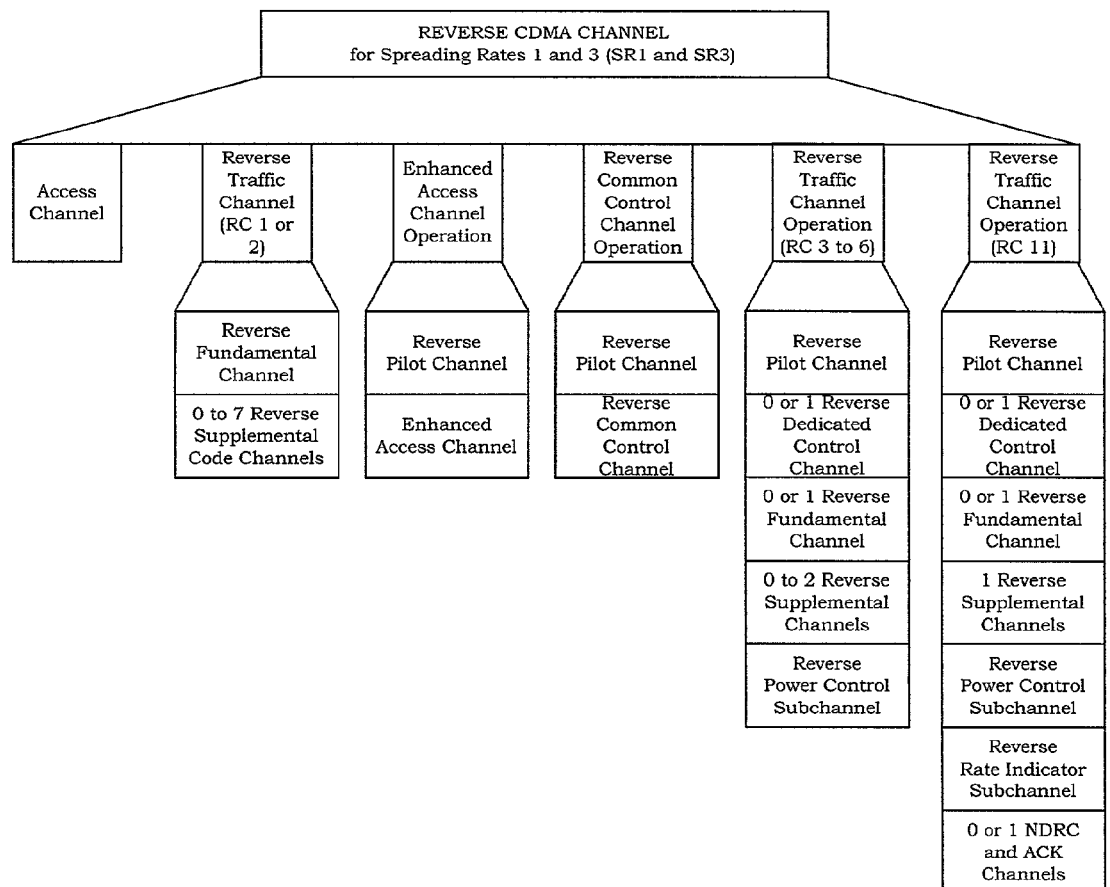
FIGS. 3A and 3B are diagrams of a reverse and a forward channel structure, respectively.

FIG. 3A is a diagram of an embodiment of a reverse channel structure capable of implementing various aspects of the invention. In this embodiment, the reverse channel structure includes an access channel, an enhanced access channel, a pilot channel (R-PICH), a common control channel (R-CCCH), a dedicated control channel (R-DCCH), a fundamental channel (R-FCH), supplemental channels (R-SCH), and a reverse rate indicator channel (R-RICH). Different, fewer, and/or additional channels may also be supported and are within the scope of the invention. These channels may be implemented similar to those defined by the cdma2000 standard. Features of some of these channels are described below.

For each communication (i.e., each call), a specific set of channels that may be used for the communication and their configurations are defined by one of a number of radio configurations (RC). Each RC defines a specific transmission format, which is characterized by various physical layer parameters such as, for example, the transmission rates, modulation characteristics, spreading rate, and so on. The radio configurations may be similar to those defined for the cdma2000 standard.

The reverse dedicated control channel (R-DCCH) is used to transmit user and signaling information (e.g., control information) to the base station during a communication. The R-DCCH may be implemented similar to the R-DCCH defined in the cdma2000 standard.

The reverse fundamental channel (R-FCH) is used to transmit user and signaling information (e.g., voice data) to the base station during a communication. The R-FCH may be implemented similar to the R-FCH defined in the cdma2000 standard.

The reverse supplemental channel (R-SCH) is used to transmit user information (e.g., packet data) to the base station during a communication. The R-SCH is supported by some radio configurations (e.g., RC3 through RC11), and is assigned to the remote terminals as needed and if available. In an embodiment, zero, one, or two supplemental channels (i.e., R-SCH1 and R-SCH2) may be assigned to the remote terminal at any given moment. In an embodiment, the R-SCH supports retransmission at the physical layer, and may utilize different coding schemes for the retransmission. For example, a retransmission may use a code rate of ½ for the original transmission. The same rate ½ code symbols may be repeated for the retransmission. In an alternative embodiment, the underlying code may be a rate ¼ code. The original transmission may use ½ of the symbols and the retransmission may use the other half of the symbols. If a third retransmission is done, it can repeat one of the group of symbols, part of each group, a subset of either group, and other possible combinations of symbols.

R-SCH2 may be used in conjunction with R-SCH1 (e.g., for RC11). In particular, R-SCH2 may be used to provide a different quality of service (QoS). Also, Type II and III hybrid ARQ schemes may be used in conjunction with the R-SCH. Hybrid ARQ schemes are generally described by S. B. Wicker in "Error Control System for Digital Communication and Storage," Prentice-Hall, 1995, Chapter 15, which is incorporated herein by reference. Hybrid ARQ schemes are also described in the cdma2000 standard.

The reverse rate indicator channel (R-RICH) is used by the remote terminal to provide information pertaining to the (packet) transmission rate on one or more reverse supplemental channels. Table 1 lists the fields for a specific format of the R-RICH. In an embodiment, for each data frame transmission on the R-SCH, the remote terminal sends a reverse rate indicator (RRI) symbol, which indicates the data rate for the data frame. The remote terminal also sends the sequence number of the data frame being transmitted, and whether the data frame is a first transmission or a retransmission. Different, fewer, and/or additional fields may also be used for the R-RICH and are within the scope of the invention. The information in Table 1 is sent by the remote terminal for each data frame transmitted on the supplemental channel (e.g., each 20 msec).

TABLE 1

| Field | Length (bits) |
|---|---|
| RRI | 3 |
| SEQUENCE_NUM | 2 |
| RETRAN_NUM | 2 |

If there are multiple reverse supplemental channels (e.g., R-SCH1 and R-SCH2), then there can be multiple R-RICH channels (e.g., R-RICH1 and R-RICH2), each with the RRI, SEQUENCE_NUM, and RETRAN_NUM fields. Alternatively, the fields for multiple reverse supplemental channels may be combined into a single R-RICH channel. In a particular embodiment, the RRI field is not used, and fixed transmission rates are used or the base station performs blind rate determination in which the base determines the transmission rate from the data. Blind rate determination may be achieved in a manner described in U.S. Pat. No. 6,175,590, entitled "METHOD AND APPARATUS FOR DETERMINING THE RATE OF RECEIVED DATA IN A VARIABLE RATE COMMUNICATION SYSTEM," issued Jan. 16, 2001, U.S. Pat. No. 5,751,725, entitled "METHOD AND APPARATUS FOR DETERMINING THE RATE OF RECEIVED DATA IN A VARIABLE RATE COMMUNICATION SYSTEM," issued May 12, 1998, both of which are assigned to the assignee of the present application and incorporated herein by reference.

Figure 3B:
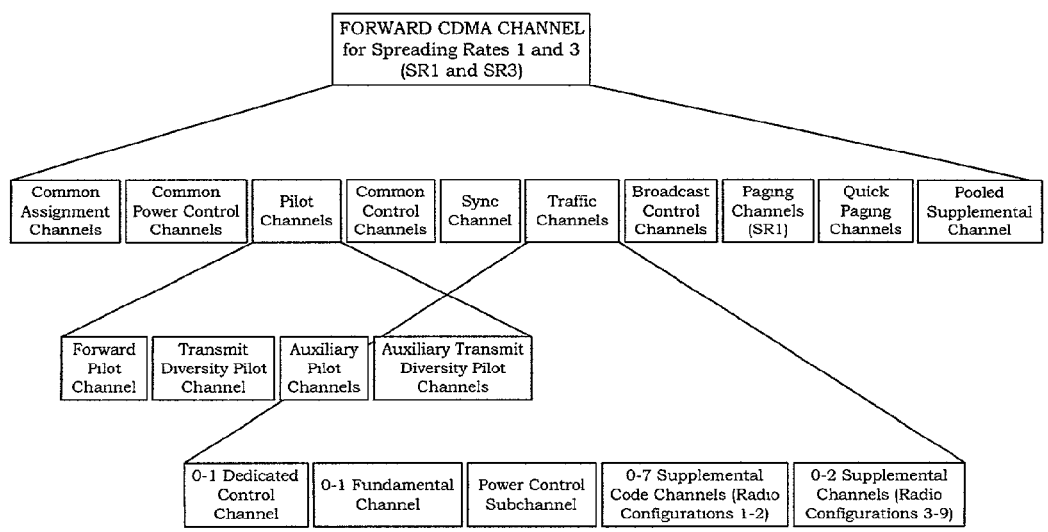

FIG. 3B is a diagram of an embodiment of a forward channel structure capable of supporting various aspects of the invention. In this embodiment, the forward channel structure includes common channels, pilot channels, and dedicated channels. The common channels include a broadcast channel (F-BCCH), a quick paging channel (F-QPCH), a common control channel (F-CCCH), and a common power control channel (F-CPCCH). The pilot channels include a basic pilot channel and an auxiliary pilot channel. And the dedicated channels include a fundamental channel (F-FCH), a supplemental channel (F-SCH), a dedicated auxiliary channel (F-APICH), a dedicated control channel (F-DCCH), and a dedicated packet control channel (F-CPDCCH). Again, different, fewer, and/or additional channels may also be supported and are within the scope of the invention. These channels may be implemented similar to those defined by the cdma2000 standard. Features of some of these channels are described below.

The forward common power control channel (F-CPCCH) is used by the base station to transmit power control subchannels (e.g., one bit per subchannel) for power control of the R-PICH, R-FCH, R-DCCH, and R-SCH. In an embodiment, upon channel assignment, a remote terminal is assigned a reverse link power control subchannel from one of three sources—the F-DCCH, F-SCH, and F-CPCCH. The F-CPCCH may be assigned if the reverse link power control subchannel is not provided from either the F-DCCH or F-SCH.

In an embodiment, the available bits in the F-CPCCH may be used to form one or more power control subchannels, which may then be assigned for different uses. For example, a number of power control subchannels may be defined and used for power control of a number of reverse link channels. Power control for multiple channels based on multiple power control subchannels may be implemented as described in U.S. Pat. No. 5,991,284, entitled "SUBCHAN-NEL POWER CONTROL," issued Nov. 23, 1999, assigned to the assignee of the present application and incorporated herein by reference.

In one specific implementation, an 800 bps power control subchannel controls the power of the reverse pilot channel (R-PICH). All reverse traffic channels (e.g., the R-FCH, R-DCCH, and R-SCH) have their power levels related to the R-PICH by a known relationship, e.g., as described in C.S0002. The ratio between two channels is often referred to as the traffic-to-pilot ratio. The traffic-to-pilot ratio (i.e., the power level of the reverse traffic channel relative to the R-PICH) can be adjusted by messaging from the base station. However, this messaging is slow, so a 100 bits/second (bps) power control subchannel may be defined and used for power control of the R-SCH. In an embodiment, this R-SCH power control subchannel controls the R-SCH relative to the R-PICH. In another embodiment, the R-SCH power control subchannel controls the absolute transmission power of the R-SCH.

In an aspect of the invention, a "congestion" control subchannel may also be defined for control of the R-SCH, and this congestion control subchannel may be implemented based on the R-SCH power control subchannel or another subchannel.

Power control for the reverse link is described in further detail below.

The forward dedicated packet control channel (F-DPCCH) is used to transmit user and signaling information to a specific remote terminal during a communication. The F-DPCCH may be used to control a reverse link packet data transmission. In an embodiment, the F-DPCCH is encoded and interleaved to enhance reliability, and may be implemented similar to the F-DCCH defined by the cdma2000 standard.

Table 2 lists the fields for a specific format of the F-DPCCH. In an embodiment, the F-DPCCH has a frame size of 48 bits, of which 16 are used for CRC, 8 bits are used for the encoder tail, and 24 bits are available for data and messaging. In an embodiment, the default transmission rate for the F-DPCCH is 9600 bps, in which case a 48-bit frame can be transmitted in 5 msec time interval. In an embodiment, each transmission (i.e., each F-DPCCH frame) is covered with a public long code of the recipient remote terminal to which the frame is targeted. This avoids the need to use an explicit address (hence, the channel is referred to as a "dedicated" channel). However, the F-DPCCH is also "common" since a large number of remote terminals in dedicated channel mode may continually monitor the channel. If a message is directed to a particular remote terminal and is received correctly, then the CRC will check.

TABLE 2

| Field | Number of Bits/Frame |
|---|---|
| Information | 24 |
| Frame Quality Indicator | 16 |
| Encoder Tail | 8 |

The F-DPCCH may be used to transmit mini-messages, such as the ones defined by the cdma2000 standard. For example, the F-DPCCH may be used to transmit a Reverse Supplemental Channel Assignment Mini Message (RSCAMM) used to grant the F-SCH to the remote terminal.

The forward common packet Ack/Nak channel (F-CPANCH) is used by the base station to transmit (1) acknowledgments (Ack) and negative acknowledgments (Nak) for a reverse link packet data transmission and (2) other control information. In an embodiment, acknowledgments and negative acknowledgments are transmitted as n-bit Ack/Nak messages, with each message being associated with a corresponding data frame transmitted on the reverse link. In an embodiment, each Ack/Nak message may include 1, 2, 3, or 4 bits (or possible more bits), with the number of bits in the message being dependent on the number of reverse link channels in the service configuration. The n-bit Ack/Nak message may be block coded to increase reliability or transmitted in the clear.

In an aspect, to improve reliability, the Ack/Nak message for a particular data frame is retransmitted in a subsequent frame (e.g., 20 msec later) to provide time diversity for the message. The time diversity provides additional reliability, or may allow for the reduction in power used to send the Ack/Nak message while maintaining the same reliability. The Ack/Nak message may use error correcting coding as is well known in the art. For the retransmission, the Ack/Nak message may repeat the exact same code word or may use incremental redundancy. Transmission and retransmission of the Ack/Nak is described in further detail below.

Several types of control are used on the forward link to control the reverse link. These include controls for supplemental channel request and grant, Ack/Nak for a reverse link data transmission, power control of the data transmission, and possibly others.

The reverse link may be operated to maintain the rise-over-thermal at the base station relatively constant as long as there is reverse link data to be transmitted. Transmission on the R-SCH may be allocated in various ways, two of which are described below:

By infinite allocation. This method is used for real-time traffic that cannot tolerate much delay. The remote terminal is allowed to transmit immediately up to a certain allocated data rate.

By scheduling. The remote terminal sends an estimate of its buffer size. The base station determines when the remote terminal is allowed to transmit. This method is used for available bit rate traffic. The goal of a scheduler is to limit the number of simultaneous transmissions so that the number of simultaneously transmitting remote terminals is limited, thus reducing the interference between remote terminals.

Since channel loading can change relatively dramatically, a fast control mechanism may be used to control the transmit power of the R-SCH (e.g., relative to the reverse pilot channel), as described below.

A communication between the remote terminal and base station to establish a connection may be achieved as follows. Initially, the remote terminal is in a dormant mode or is monitoring the common channels with the slotted timer active (i.e., the remote terminal is monitoring each slot). At a particular time, the remote terminal desires a data transmission and sends a short message to the base station requesting a reconnection of the link. In response, the base station may send a message specifying the parameters to be used for the communication and the configurations of various channels. This information may be sent via an Extended Channel Assignment Message (ECAM), a specially defined message, or some other message. This message may specify the following:

The MAC_ID for each member of the remote terminal's Active Set or a subset of the Active Set. The MAC_ID is later used for addressing on the forward link.

Whether the R-DCCH or R-FCH is used on the reverse link.

For the F-CPANCH, the spreading (e.g., Walsh) codes and Active Set to be used. This may be achieved by (1) sending the spreading codes in the ECAM, or (2) transmitting the spreading codes in a broadcast message, which is received by the remote terminal. The spreading codes of neighbor cells may need to be included. If the same spreading codes can be used in neighboring cells, only a single spreading code may need to be sent.

For the F-CPCCH, the Active Set, the channel identity, and the bit positions. In an embodiment, the MAC_ID may be hashed to the F-CPCCH bit positions to obviate the need to send the actual bit positions or subchannel ID to the remote terminal. This hashing is a pseudo-random method to map a MAC_ID to a subchannel on the F-CPCCH. Since different simultaneous remote terminals are assigned distinct MAC_IDs, the hashing can be such that these MAC_IDs also map to distinct F-CPCCH subchannels. For example, if there are K possible bit positions and N possible MAC_IDs, then $K=\Box N \times ((40503 \times KEY) \mod 2^{16})/2^{16} \Box$, where KEY is the number that is fixed in this instance. There are many other hash functions that can be used and discussions of such can be found in many textbooks dealing with computer algorithms.

In an embodiment, the message from the base station (e.g., the ECAM) is provided with a specific field, USE_OLD_SERV_CONFIG, used to indicate whether or not the parameters established in the last connection are to be used for the reconnection. This field can be used to obviate the need to send the Service Connect Message upon reconnection, which may reduce delay in re-establishing the connection.

Once the remote terminal has initialized the dedicated channel, it continues, for example, as described in the cdma2000 standard.

As noted above, better utilization of the reverse link resources may be achieved if the resources can be quickly allocated as needed and if available. In a wireless (and especially mobile) environment, the link conditions continually fluctuate, and long delay in allocating resources may result in inaccurate allocation and/or usage. Thus, in accordance with an aspect of the invention, mechanisms are provided to quickly assign and de-assign supplemental channels.

Figure 4:
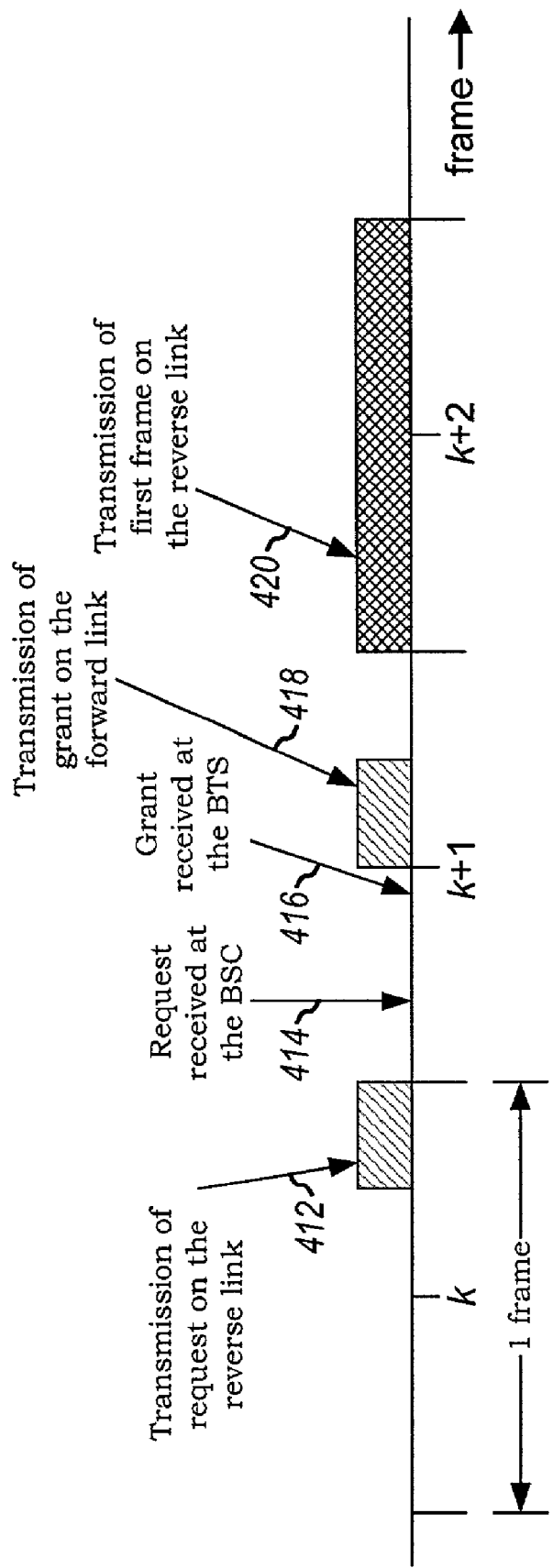
FIG. 4 is a diagram illustrating a communication between the remote terminal and base station to assign a reverse link supplemental channel (R-SCH)

FIG. 4 is a diagram illustrating a communication between the remote terminal and base station to assign and de-assign a reverse link supplemental channel (R-SCH), in accordance with an embodiment of the invention. The R-SCH may be quickly assigned and de-assigned as needed. When the remote terminal has packet data to send that requires usage of the R-SCH, it requests the R-SCH by sending to the base station a Supplemental Channel Request Mini Message (SCRMM) (step 412). The SCRMM is a 5 msec message that may be sent on the R-DCCH or R-FCH. The base station receives the message and forwards it to the BSC (step 414). The request may or may not be granted. If the request is granted, the base station receives the grant (step 416) and transmits the R-SCH grant using a Reverse Supplemental Channel Assignment Mini Message (RSCAMM) (step 418). The RSCAMM is also a 5 msec message that may be sent on the F-FCH or F-DCCH (if allocated to the remote terminal) or on the F-DPCCH (otherwise). Once assigned, the remote terminal may thereafter transmit on the R-SCH (step 420).

Table 3 lists the fields for a specific format of the RSCAMM. In this embodiment, the RSCAMM includes 8 bits of layer 2 fields (i.e., the MSG_TYPE, ACK_SEQ, MSG_SEQ, and ACK_REQUIREMENT fields), 14 bits of layer 3 fields, and two reserved bits that are also used for padding as described in C.S0004 and C.S0005. The layer 3 (i.e., signaling layer) may be as defined in the cdma2000 standard.

TABLE 3

| Field | Length (Bits) |
|---|---|
| MSG_TYPE | 3 |
| ACK_SEQUENCE | 2 |
| MSG_SEQUENCE | 2 |
| ACK_REQUIREMENT | 1 |
| REV_SCH_ID | 1 |
| REV_SCH_DURATION | 4 |
| REV_SCH_START_TIME | 5 |
| REV_SCH_NUM_BITS_IDX | 4 |
| RESERVED | 2 |

When the remote terminal no longer has data to send on the R-SCH, it sends a Resource Release Request Mini Message (RRRMM) to the base station. If there is no additional signaling required between the remote terminal and base station, the base station responds with an Extended Release Mini Message (ERMM). The RRRMM and ERMM are also 5 msec messages that may be sent on the same channels used for sending the request and grant, respectively.

There are many scheduling algorithms that may be used to schedule the reverse link transmissions of remote terminals. These algorithms may tradeoff between rates, capacity, delay, error rates, and fairness (which gives all users some minimal level of services), to indicate some of the main criteria. In addition, the reverse link is subject to the power limitations of the remote terminal. In a single cell environment, the greatest capacity will exist when the smallest number of remote terminals is allowed to transmit with the highest rate that the remote terminal can support—both in terms of capability and the ability to provide sufficient power. However, in a multiple cell environment, it may be preferable for remote terminals near the boundary with another cell to transmit at a lower rate. This is because their transmissions cause interference into multiple cells—not just a single cell. Another aspect that tends to maximize the reverse link capacity is to operate a high rise-over-thermal at the base station, which indicates high loading on the reverse link. It is for this reason that aspects of the invention use scheduling. The scheduling attempts to have a few number of remote terminals simultaneously transmit—those that do transmit are allowed to transmit at the highest rates that they can support.

However, a high rise-over-thermal tends to result in less stability as the system is more sensitive to small changes in loading. It is for this reason that fast scheduling and control is important. Fast scheduling is important because the channel conditions change quickly. For instance, fading and shadowing processes may result in a signal that was weakly received at a base station suddenly becoming strong at the base station. For voice or certain data activity, the remote terminal autonomously changes the transmission rate While scheduling may be able to take some of this into account, scheduling may not be able to react sufficiently fast enough. For this reason, aspects of the invention provide fast power control techniques, which are described in further detail below.

An aspect of the invention provides a reliable acknowledgment/negative acknowledgment scheme to facilitate efficient and reliable data transmission. As described above, acknowledgments (Ack) and negative acknowledgments (Nak) are sent by the base station for data transmission on the R-SCH. The Ack/Nak can be sent using the F-CPANCH.

Table 4 shows a specific format for an Ack/Nak message. In this specific embodiment, the Ack/Nak message includes 4 bits that are assigned to four reverse link channels—the R-FCH, R-DCCH, R-SCH1, and R-SCH2. In an embodiment, an acknowledgment is represented by a bit value of zero ("0") and a negative acknowledgment is represented by a bit value of one ("1"). Other Ack/Nak message formats may also be used and are within the scope of the invention.

TABLE 4

| Description | All Channels Used Number_Type (binary) | R-FCH, R-DCCH, and R-SCH1 Used Number_Type (binary) | R-FCH and R-DCCH Used Number_Type (binary) |
|---|---|---|---|
| ACK_R-FCH | xxx0 | xxx0 | xx00 |
| NAK_R-FCH | xxx1 | xxx1 | xx11 |
| ACK_R-DCCH | xx0x | xx0x | — |
| NAK_R-DCCH | xx1x | xx1x | — |
| ACK_R-SCH1 | x0xx | 00xx | 00xx |
| NAK_R-SCH1 | x1xx | 11xx | 11xx |
| ACK_R-SCH2 | 0xxx | — | — |
| NAK_R-SCH2 | 1xxx | — | — |

In an embodiment, the Ack/Nak message is sent block coded but a CRC is not used to check for errors. This keeps the Ack/Nak message short and further allows the message to be sent with a small amount of energy. However, no coding may also be used for the Ack/Nak message, or a CRC may be attached to the message, and these variations are within the scope of the invention. In an embodiment, the base station sends an Ack/Nak message corresponding to each frame in which the remote terminal has been given permission to transmit on the R-SCH, and does not send Ack/Nak messages during frames that the remote terminal is not given permission to transmit.

During a packet data transmission, the remote terminal monitors the F-CPANCH for Ack/Nak messages that indicate the results of the transmission. The Ack/Nak messages may be transmitted from any number of base stations in the remote terminal's Active Set (e.g., from one or all base stations in the Active Set). The remote terminal can perform different actions depending on the received Ack/Nak messages. Some of these actions are described below.

If an Ack is received by the remote terminal, the data frame corresponding to the Ack may be removed from the remote terminal's physical layer transmit buffer (e.g., data source 210 in FIG. 2) since the data frame was correctly received by the base station.

If a Nak is received by the remote terminal, the data frame corresponding to the Nak may be retransmitted by the remote terminal if it is still in the physical layer transmit buffer. In an embodiment, there is a one-to-one correspondence between a forward link Ack/Nak message and a transmitted reverse link data frame. The remote terminal is thus able to identify the sequence number of the data frame not received correctly by the base station (i.e., the erased frame) based on the frame in which the Nak was received. If this data frame has not been discarded by the remote terminal, it may be retransmitted at the next available time interval, which is typically the next frame.

If neither an Ack nor a Nak was received, there are several next possible actions for the remote terminal. In one possible action, the data frame is maintained in the physical layer transmit buffer and retransmitted. If the retransmitted data frame is then correctly received at the base station, then the base station transmits an Ack. Upon correct receipt of this Ack, the remote terminal discards the data frame. This would be the best approach if the base station did not receive the reverse link transmission.

Another possible action is for the remote terminal to discard the data frame if neither an Ack nor a Nak was received. This would be the best alternative if the base station had received the frame but the Ack transmission was not received by the remote terminal. However, the remote terminal does not know the scenario that occurred and a policy needs to be chosen. One policy would be to ascertain the likelihood of the two events happening and performing the action that maximizes the system throughput.

In an embodiment, each Ack/Nak message is retransmitted a particular time later (e.g., at the next frame) to improve reliability of the Ack/Nak. Thus, if neither an Ack nor a Nak was received, the remote terminal combines the retransmitted Ack/Nak with the original Ack/Nak. Then, the remote terminal can proceed as described above. And if the combined Ack/Nak still does not result in a valid Ack or Nak, the remote terminal may discard the data frame and continue to transmit the next data frame in the sequence. The second transmission of the Ack/Nak may be at the same or lower power level relative to that of the first transmission.

If the base station did not actually receive the data frame after retransmissions, then a higher signaling layer at the base station may generate a message (e.g., an RLP NAK), which may result in the retransmission of the entire sequence of data frames that includes the erased frame.

FIG. 5A is a diagram illustrating a data transmission on the reverse link (e.g., the R-SCH) and an Ack/Nak transmission on the forward link. The remote terminal initially transmits a data frame, in frame k, on the reverse link (step 512). The base station receives and processes the data frame, and provides the demodulated frame to the BSC (step 514). If the remote terminal is in soft handoff, the BSC may also receive demodulated frames for the remote terminal from other base stations.

Based on the received demodulated frames, the BSC generates an Ack or a Nak for the data frame. The BSC then sends the Ack/Nak to the base station(s) (step 516), which then transmit the Ack/Nak to the remote terminal during frame k+1 (step 518). The Ack/Nak may be transmitted from one base station (e.g., the best base station) or from a number base stations in the remote terminal's Active Set. The remote terminal receives the Ack/Nak during frame k+1. If a Nak is received, the remote terminal retransmits the erased frame at the next available transmission time, which in this example is frame k+2 (step 520). Otherwise, the remote terminal transmits the next data frame in the sequence.

FIG. 5B is a diagram illustrating a data transmission on the reverse link and a second transmission of the Ack/Nak message. The remote terminal initially transmits a data frame, in frame k, on the reverse link (step 532). The base station receives and processes the data frame, and provides the demodulated frame to the BSC (step 534). Again, for soft handoff, the BSC may receive other demodulated frames for the remote terminal from other base stations.

Based on the received demodulated frames, the BSC generates an Ack or a Nak for the frame. The BSC then sends the Ack/Nak to the base station(s) (step 536), which then transmit the Ack/Nak to the remote terminal during frame k+1 (step 538). In this example, the remote terminal does not receive the Ack/Nak transmitted during frame k+1. However, the Ack/Nak for the data frame transmitted in frame k is transmitted a second time during frame k+2, and is received by the remote terminal (step 540). If a Nak is received, the remote terminal retransmits the erased frame at the next available transmission time, which in this example is frame k+3 (step 542). Otherwise, the remote terminal transmits the next data frame in the sequence. As shown in FIG. 5B, the second transmission of the Ack/Nak improves the reliability of the feedback, and can result in improved performance for the reverse link.

In an alternative embodiment, the data frames are not sent back to the BSC from the base station, and the Ack/Nak is generated from the base station.

Figure 6A:
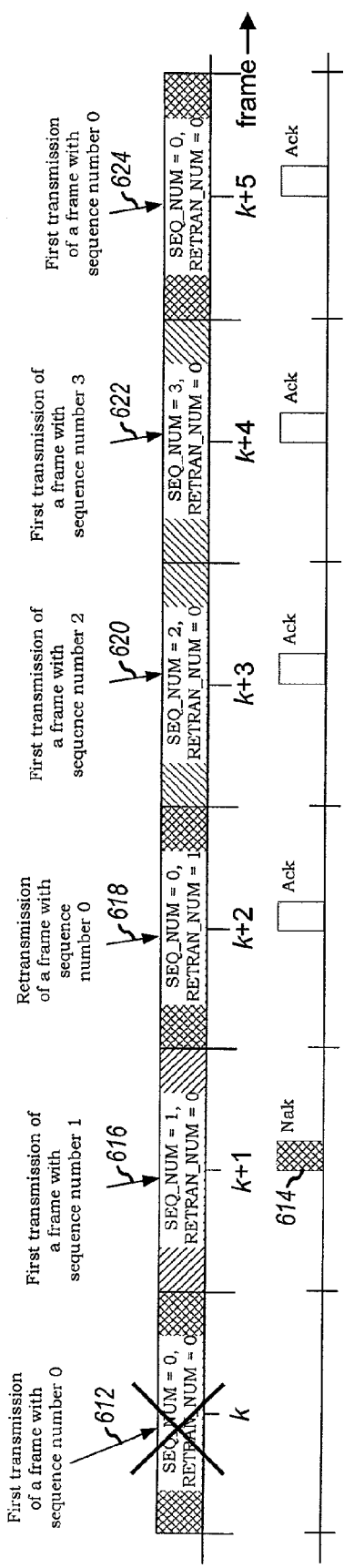
FIGS. 6A and 6B are diagrams illustrating an acknowledgment sequencing with short and long acknowledgment delays, respectively.

FIG. 6A is a diagram illustrating an acknowledgment sequencing with short acknowledgment delay. The remote terminal initially transmits a data frame with a sequence number of zero, in frame k, on the reverse link (step 612). For this example, the data frame is received in error at the base station, which then sends a Nak during frame k+1 (step 614). The remote terminal also monitors the F-CPANCH for an Ack/Nak message for each data frame transmitted on the reverse link. The remote terminal continues to transmit a data frame with a sequence number of one in frame k+1 (step 616).

Upon receiving the Nak in frame k+1, the remote terminal retransmits the erased frame with the sequence number of zero, in frame k+2 (step 618). The data frame transmitted in frame k+1 was received correctly, as indicated by an Ack received during frame k+2, and the remote terminal transmits a data frame with a sequence number of two in frame k+3 (step 620). Similarly, the data frame transmitted in frame k+2 was received correctly, as indicated by an Ack received during frame k+3, and the remote terminal transmits a data frame with a sequence number of three in frame k+4 (step 622). In frame k+5, the remote terminal transmits a data frame with a sequence number of zero for a new packet (step 624).

Figure 6B:
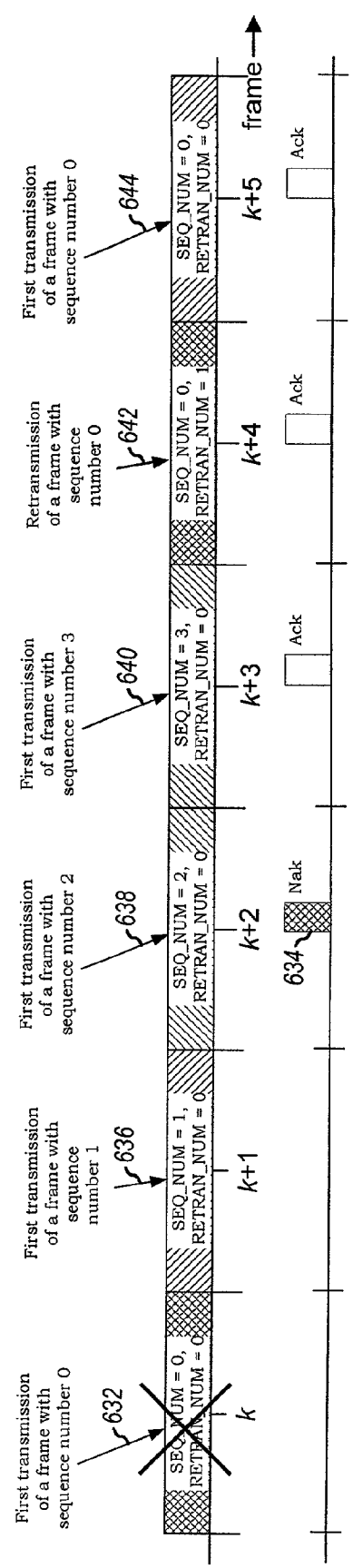

FIG. 6B is a diagram illustrating an acknowledgment sequencing with long acknowledgment delay such as when the remote terminal demodulates the Ack/Nak transmission based upon the retransmission of the Ack/Nak as described above. The remote terminal initially transmits a data frame with a sequence number of zero, in frame k, on the reverse link (step 632). The data frame is received in error at the base station, which then sends a Nak (step 634). For this example, because of the longer processing delay, the Nak for frame k is transmitted during frame k+2. The remote terminal continues to transmit a data frame with a sequence number of one in frame k+1 (step 636) and a data frame with a sequence number of two in frame k+2 (step 638).

For this example, the remote terminal receives the Nak in frame k+2, but is not able to retransmit the erased frame at the next transmission interval. Instead, the remote terminal transmits a data frame with a sequence number of three in frame k+3 (step 640). At frame k+4, the remote terminal retransmits the erased frame with the sequence number of zero (step 642) since this frame is still in the physical layer buffer. Alternatively, the retransmission may be in frame k+3. And since the data frame transmitted in frame k+1 was received correctly, as indicated by an Ack received during frame k+3, and the remote terminal transmits a data frame with a sequence number of zero for a new packet (step 644).

As shown in FIG. 6B, the erased frame may be retransmitted at any time as long as it is still available in the buffer and there is no ambiguity as to which higher layer packet the data frame belongs to. The longer delay for the retransmission may be due to any number of reasons such as (1) longer delay to process and transmit the Nak, (2) non-detection of the first transmission of the Nak, (3) longer delay to retransmit the erased frame, and others.

An efficient and reliable Ack/Nak scheme can improve the utilization of the reverse link. A reliable Ack/Nak scheme may also allow data frames to be transmitted at lower transmit power. For example, without retransmission, a data frame needs to be transmitted at a higher power level ($P_1$) required to achieve one percent frame error rate (1% FER). If retransmission is used and is reliable, a data frame may be transmitted at a lower power level ($P_2$) required to achieve 10% FER. The 10% erased frames may be retransmitted to achieve an overall 1% FER for the transmission. Typically, $1.1 \cdot P_2 < P_1$, and less transmit power is used for a transmission using the retransmission scheme. Moreover, retransmission provides time diversity, which may improve performance. The retransmitted frame may also be combined with the first transmission of the frame at the base station, and the combined power from the two transmissions may also improve performance. The recombining may allow an erased frame to be retransmitted at a lower power level.

An aspect of the invention provides various power control schemes for the reverse link. In an embodiment, reverse link power control is supported for the R-FCH, R-SCH, and R-DCCH. This can be achieved via a (e.g., 800 bps) power control channel, which may be partitioned into a number of power control subchannels. For example, a 100 bps power control subchannel may be defined and used for the R-SCH. If the remote terminal has not been allocated a F-FCH or F-DCCH, then the F-CPCCH may be used to send power control bits to the remote terminal.

In one implementation, the (e.g., 800 bps) power control channel is used to adjust the transmit power of the reverse link pilot. The transmit power of the other channels (e.g., the R-FCH) is set relative to that of the pilot (i.e., by a particular delta). Thus, the transmit power for all reverse link channels may be adjusted along with the pilot. The delta for each non-pilot channel may be adjusted by signaling. This implementation does not provide flexibility to quickly adjust the transmit power of different channels.

In one embodiment, the forward common power control channel (F-CPCCH) may be used to form one or more power control subchannels that may then be used for various purposes. Each power control subchannel may be defined using a number of available bits in the F-CPCCH (e.g., the $m^{th}$ bit in each frame). For example, some of the available bits in the F-CPCCH may be allocated for a 100 bps power control subchannel for the R-SCH. This R-SCH power control subchannel may be assigned to the remote terminal during channel assignment. The R-SCH power control subchannel may then be used to (more quickly) adjust the transmit power of the designated R-SCH, e.g., relative to that of the pilot channel. For a remote terminal in soft handoff, the R-SCH power control may be based on the OR-of-the-downs rule, which decreases the transmit power if any base station in the remote terminal's Active Set directs a decrease. Since the power control is maintained at the base station, this permits the base station to adjust the transmitted power with minimal amount of delay and thus adjust the loading on the channel.

The R-SCH power control subchannel may be used in various manners to control the transmission on the R-SCH. In an embodiment, the R-SCH power control subchannel may be used to direct the remote terminal to adjust the transmit power on the R-SCH by a particular amount (e.g., 1 dB, 2 dB, or some other value). In another embodiment, the subchannel may be used to direct the remote terminal to reduce or increase transmit power by a large step (e.g., 3 dB, or possibly more). In both embodiments, the adjustment in transmit power may be relative to the pilot transmit power. In another embodiment, the subchannel may be directed to adjust the data rate allocated to the remote terminal (e.g., to the next higher or lower rate). In yet another embodiment, the subchannel may be used to direct the remote terminal to temporarily stop transmission. And in yet another embodiment, the remote terminal may apply different processing (e.g., different interleaving interval, different coding, and so on) based on the power control command. The R-SCH power control subchannel may also be partitioned into a number of "sub-subchannels", each of which may be used in any of the manners described above. The sub-subchannels may have the same or different bit rates. The remote terminal may apply the power control immediately upon receiving the command, or may apply the command at the next frame boundary.

The ability to reduce the R-SCH transmit power by a large amount (or down to zero) without terminating the communication session is especially advantageous to achieve better utilization of the reverse link. Temporary reduction or suspension of a packet data transmission can typically be tolerated by the remote terminal. These power control schemes can be advantageously used to reduce interference from a high rate remote terminal.

Power control of the R-SCH may be achieved in various manners. In one embodiment, a base station monitors the received power from the remote terminals with a power meter. The base station may even be able to determine the amount of power received from each channel (e.g., the R-FCH, R-DCCH, R-SCH, and so on). The base station is also able to determine the interference, some of which may be contributed by remote terminals not being served by this base station. Based on the collected information, the base station may adjust the transmit power of some or all remote terminals based on various factors. For example, the power control may be based on the remote terminals' category of service, recent performance, recent throughput, and so on. The power control is performed in a manner to achieve the desired system goals.

Power control may be implemented in various manners. Example implementations are described in U.S. Pat. No. 5,485,486, entitled "METHOD AND APPARATUS FOR CONTROLLING TRANSMISSION POWER IN A CDMA CELLULAR MOBILE TELEPHONE SYSTEM," issued Jan. 16, 1996, U.S. Pat. No. 5,822,318, entitled "METHOD AND APPARATUS FOR CONTROLLING POWER IN A VARIABLE RATE COMMUNICATION SYSTEM," issued Oct. 13, 1998, and U.S. Pat. No. 6,137,840, entitled "METHOD AND APPARATUS FOR PERFORMING FAST POWER CONTROL IN A MOBILE COMMUNICATION SYSTEM," issued Oct. 24, 2000, all assigned to the assignee of the present application and incorporated herein by reference.

In a typical method of power control that is used to control the level of the R-PICH channel, the base station measures the level of the R-PICH, compares it to a threshold, and then determines whether to increase or decrease the power of the remote terminal. The base station transmits a bit to the remote terminal instructing it to increase or decrease its output power. If the bit is received in error, the remote terminal will transmit at the incorrect power. During the next measurement of the R-PICH level received by the base station, the base station will determine that the received level is not at the desired level and send a bit to the remote terminal to change its transmit power. Thus, bit errors do not accumulate and the loop controlling the remote terminal's transmit power will stabilize to the correct value.

Errors in the bits sent to the remote terminal to control the traffic-to-pilot ratio for congestion power control can cause the traffic-to-pilot ratio to be other than that desired. However, the base station typically monitors the level of the R-PICH for reverse power control or for channel estimation. The base station can also monitor the level of the received R-SCH. By taking the ratio of the R-SCH level to the R-PICH level, the base station can estimate the traffic-to-pilot ratio in use by the remote terminal. If the traffic-to-pilot ratio is not that which is desired, then the base station can set the bit that controls the traffic-to-pilot ratio to correct for the discrepancy. Thus, there is a self-correction for bit errors.

Once a remote terminal has received a grant for the R-SCH, the remote terminal typically transmits at the granted rate (or below in case it doesn't have enough data to send or does not have sufficient power) for the duration of the grant. The channel load from other remote terminals can vary quite quickly as a result of fading and the like. As such, it may be difficult for the base station to estimate the loading precisely in advance.

In an embodiment, a "congestion" power control subchannel may be provided to control a group of remote terminals in the same manner. In this case, instead of a single remote terminal monitoring the power control subchannel to control the R-SCH, a group of remote terminals monitor the control subchannel. This power control subchannel can be at 100 bps or at any other transmission rate. In one embodiment, the congestion control subchannel is implemented with the power control subchannel used for the R-SCH. In another embodiment, the congestion control subchannel is implemented as a "sub-subchannel" of the R-SCH power control subchannel. In yet another embodiment, the congestion control subchannel is implemented as a subchannel different from the R-SCH power control subchannel. Other implementations of the congestion control subchannel may also be contemplated and are within the scope of the invention.

The remote terminals in the group may have the same category service (e.g., remote terminals having low priority available bit rate services) and may be assigned to a single power control bit per base station. This group control based on a single power control stream performs similar to that directed to a single remote terminal to provide for congestion control on the reverse link. In case of capacity overload, the base station may direct this group of remote terminals to reduce their transmit power or their data rates, or to temporarily stop transmitting, based on a single control command. The reduction in the R-SCH transmit power in response to the congestion control command may be a large downward step relative to the transmit power of the pilot channel.

The advantage of a power control stream going to a group of remote terminals instead of a single remote terminal is that less overhead power is required on the forward link to support the power control stream. It should be noted that the transmit power of a bit in the power control stream can be equal to the power of the normal power control stream used to the control the pilot channel for the remote terminal that requires the most power. That is, the base station can determine the remote terminal in the group that requires the greatest power in its normal power control stream and then use this power to transmit the power control bit used for congestion control.

Figure 7:
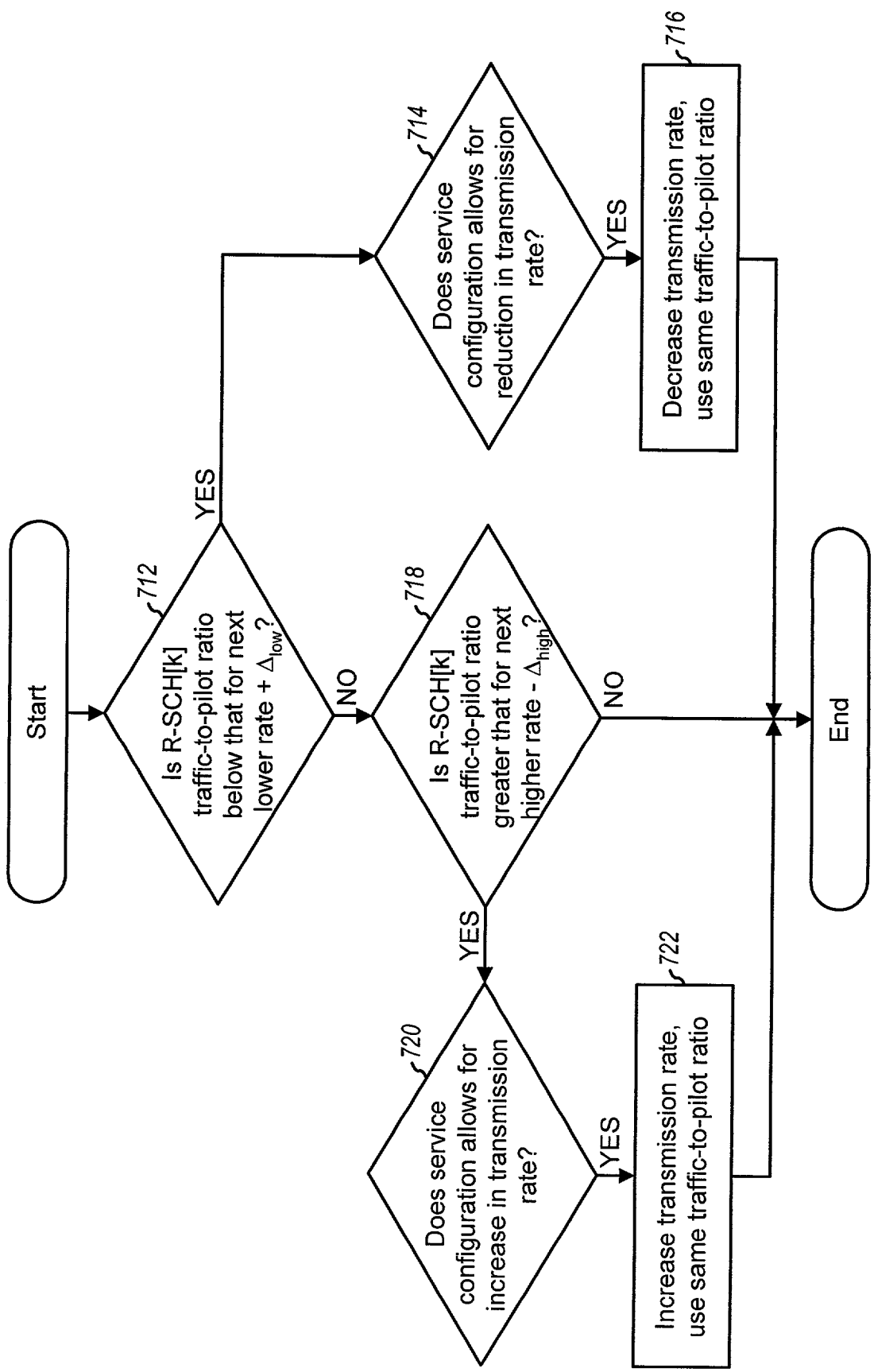
FIG. 7 is a flow diagram that illustrates a variable rate data transmission on the R-SCH with fast congestion control, in accordance with an embodiment of the invention.

FIG. 7 is a flow diagram that illustrates a variable rate data transmission on the R-SCH with fast congestion control, in accordance with an embodiment of the invention. During the transmission on the R-SCH, the remote terminal transmits in accordance with the data rate granted in the Reverse Supplemental Channel Assignment Mini Message (RSAMM). If variable rate operation is permitted on the R-SCH, the remote terminal may transmit at any one of a number of permitted data rates.

If the remote terminal's R-SCH has been assigned to a congestion control subchannel, then, in an embodiment, the remote terminal adjusts the traffic-to-pilot ratio based upon the bits received in the congestion control subchannel. If variable rate operation is permitted on the R-SCH, the remote terminal checks the current traffic-to-pilot ratio. If it is below the level for a lower data rate, then the remote terminal reduces its transmission rate to the lower rate. If it is equal to or above the level for a higher data rate, then the remote terminal increases its transmission rate to the higher rate if it has sufficient data to send.

Prior to the start of each frame, the remote terminal determines the rate to use for transmitting the next data frame. Initially, the remote terminal determines whether the R-SCH traffic-to-pilot ratio is below that for the next lower rate plus a margin $\Delta_{low}$, at step 712. If the answer is yes, a determination is made whether the service configuration allows for a reduction in the data rate, at step 714. And if the answer is also yes, the data rate is decreased, and the same traffic-to-pilot ratio is used, at step 716. And if the service configuration does not allow for a rate reduction, a particular embodiment would permit the remote terminal to temporarily stop transmitting.

Back at step 712, if the R-SCH traffic-to-pilot ratio is not above that for the next lower data rate plus the margin $\Delta_{low}$, a determination is next made as to whether the R-SCH traffic-to-pilot ratio is greater than that for the next higher data rate minus a margin $\Delta_{high}$, at step 718. If the answer is yes, a determination is made whether the service configuration allows for an increase in the data rate, at step 720. And if the answer is also yes, the transmission rate is increased, and the same traffic-to-pilot ratio is used, at step 722. And if the service configuration does not allow for a rate increase, the remote terminal transmits at the current rate.

Figure 8:
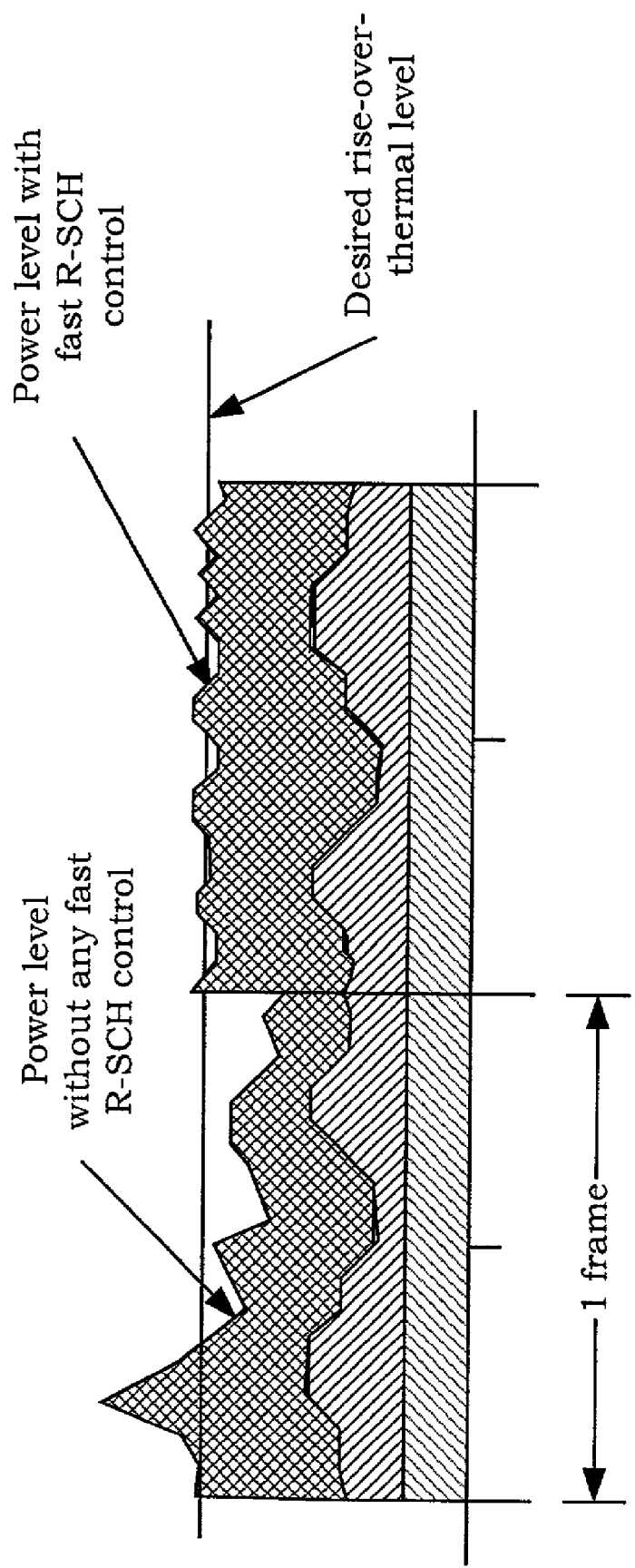
FIG. 8 is a diagram illustrating improvement that may be possible with fast control of the R-SCH.

FIG. 8 is a diagram illustrating improvement that may be possible with fast control of the R-SCH. On the left frame, without any fast control of the R-SCH, the rise-over-thermal at the base station varies more widely, exceeding the desired rise-over-thermal level by a larger amount in some instances (which may result in performance degradation for the data transmissions from the remote terminals), and falling under desired rise-over-thermal level by a larger amount in some other instances (resulting in under-utilization of the reverse link resources). In contrast, on the right frame, with fast control of the R-SCH, the rise-over-thermal at the base station is maintained more closely to the desired rise-over-thermal level, which results in improved reverse link utilization and performance.

In an embodiment, a base station may schedule more than one remote terminal (via SCAM or ESCAM) to transmit, in response to receiving multiple requests (via SCRM or SCRMM) from different remote terminals. The granted remote terminals may thereafter transmit on the R-SCH. If overloading is detected at the base station, a "fast reduce" bit stream may be used to turn off (i.e., disable) a set of remote terminals (e.g., all except one remote terminal). Alternatively, the fast reduce bit stream may be used to reduce the data rates of the remote terminals (e.g., by half). Temporarily disabling or reducing the data rates on the R-SCH for a number of remote terminals may be used for congestion control, as described in further detail below. The fast reduce capability may also be advantageously used to shorten the scheduling delay.

When the remote terminals are not in soft handoff with other base stations, the decision on which remote terminal is the most advantaged (efficient) to use the reverse link capacity may be made at the BTS. The most efficient remote terminal may then be allowed to transmit while the others are temporarily disabled. If the remote terminal signals the end of its available data, or possibly when some other remote terminal becomes more efficient, the active remote terminal can quickly be changed. These schemes may increase the throughput of the reverse link.

In contrast, for a usual set up in a cdma2000 system, a R-SCH transmission can only start or stop via layer 3 messaging, which may take several frames from composing to decoding at the remote terminal to get across. This longer delay causes a scheduler (e.g., at the base station or BSC) to work with (1) less reliable, longer-term predictions about the efficiency of the remote terminal's channel condition (e.g., the reverse link target pilot $Ec/(No+Io)$ or set point), or (2) gaps in the reverse link utilization when a remote terminal notifies the base station of the end of its data (a common occurrence since a remote terminal often claims it has a large amount of data to send to the base station when requesting the R-SCH).

Referring back to FIG. 2, the elements of remote terminal 106 and base station 104 may be designed to implement various aspects of the invention, as described above. The elements of the remote terminal or base station may be implemented with a digital signal processor (DSP), an application specific integrated circuit (ASIC), a processor, a microprocessor, a controller, a microcontroller, a field programmable gate array (FPGA), a programmable logic device, other electronic units, or any combination thereof. Some of the functions and processing described herein may also be implemented with software executed on a processor, such as controller 230 or 270.

Headings are used herein to serve as general indications of the materials being disclosed, and are not intended to be construed as to scope.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling transmit power of a supplemental channel in a reverse link of a wireless communication system, comprising:

receiving a first power control stream for controlling the transmit power of the supplemental channel in combination with at least one other reverse link channel;

receiving a second power control stream for controlling a transmit characteristic of only the supplemental channel; and adjusting the transmit power and characteristic of the supplemental channel based on the first and second power control streams.

2. The method of claim 1, wherein the second power control stream controls the transmit power of the supplemental channel relative to that of a designated reverse link channel.

3. The method of claim 1, wherein the second power control stream controls a data rate of the supplemental channel.

4. The method of claim 1, wherein the second power control stream enables and disables transmission on the supplemental channel.

5. The method of claim 1, wherein the transmit power of the supplemental channel is adjusted by a larger step size, in response to the second power control stream, than the step size for the first power control stream.

6. The method of claim 1, wherein the second power control stream is assigned to a plurality of remote terminals.

7. The method of claim 6, wherein supplemental channels for the plurality of remote terminals are controlled in similar manner by the second power control stream.

8. A remote terminal for a wireless communication system, comprising:

a transmit data processor configurable to process and transmit:

data and signaling on a reverse fundamental channel, packet data on an assigned reverse supplemental channel, signaling on a reverse control channel, and information related to a packet data transmission on a reverse indicator channel;

a receive data processor configurable to receive a plurality of power control streams on a forward power control channel, the plurality of power control streams including a first power control stream and a second power control stream; and a controller coupled to the transmit and receive data processors and configured to control:

a transmit power of the reverse supplemental channel in combination with at least one other reverse link channel based on the first power control stream; and a transmit characteristic of only the reverse supplemental channel based on the second power control stream.

9. The remote terminal of claim 8, wherein the receive data processor is further configurable to receive, on a forward acknowledgment channel, signaling indicative of received status of a packet data transmission on the reverse supplemental channel.

* * * * *